(12) United States Patent
Ushijima et al.

(10) Patent No.: US 6,524,212 B2
(45) Date of Patent: Feb. 25, 2003

(54) TOROIDAL-TYPE CONTINUOUSLY VARIABLE TRANSMISSION FOR AUTOMOBILES

(75) Inventors: Kenshi Ushijima, Kanagawa (JP); Toshikazu Nanbu, Kanagawa (JP); Nobutaka Chiba, Yokohama (JP); Jun Watanabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 14 days.

(21) Appl. No.: 09/814,165

(22) Filed: Mar. 22, 2001

(65) Prior Publication Data

US 2002/0010051 A1 Jan. 24, 2002

(30) Foreign Application Priority Data

Mar. 23, 2000 (JP) .......................... 2000-081587

(51) Int. Cl.[7] .............................................. F16H 57/04
(52) U.S. Cl. ................. 476/8; 476/40; 476/73
(58) Field of Search ............... 476/40, 9, 8, 72, 476/73

(56) References Cited

U.S. PATENT DOCUMENTS

| 4,909,092 A | * | 3/1990 | Machida et al. ............... 476/40 |
| 5,372,033 A | | 12/1994 | Jackson et al. ............. 73/53.05 |
| 5,575,733 A | * | 11/1996 | Machida et al. ............. 384/470 |
| 5,662,546 A | * | 9/1997 | Takata et al. ................. 476/40 |
| 5,676,618 A | | 10/1997 | Nakano et al. ................ 476/10 |
| 5,902,207 A | * | 5/1999 | Sugihara ..................... 475/127 |
| 6,165,100 A | * | 12/2000 | Mitamura et al. ............ 476/40 |
| 6,227,996 B1 | * | 5/2001 | Nakano ........................ 476/10 |
| 6,375,593 B2 | * | 4/2002 | Miyata et al. .............. 384/492 |

OTHER PUBLICATIONS

Japanese Industrial Standard, "Surface roughness—Definitions and designation," JIS B 0601, published by Japanese Standards Association, 1994, pp. 1–25.
Entwurf DIN 4776, Deutsche Norm, Nov. 1985, pp. 1–7.
DIN EN ISO 13565–1, Deutsche Norm, Apr. 1998, pp. 1–7.
DIN EN ISO 13565–2, Deutsche Norm, Apr. 1998, pp. 1–8.
Japanese Industrial Standard, "Structural Steels with Specified Hardenability Bands," JIS G 4052, published by Japanese Standards Association, 1979, pp. 542–561.

* cited by examiner

*Primary Examiner*—Jack Lavinder
*Assistant Examiner*—Benjamin A Pezzlo
(74) *Attorney, Agent, or Firm*—Foley & Lardner

(57) ABSTRACT

A toroidal-type continuously variable transmission (CVT), including rolling elements having traction surfaces cooperating with each other to transmit a power between the rolling elements via a traction oil film formed between the traction surfaces. The traction surfaces have the microstructure that is defined with respect to a thickness of the traction oil film formed when the temperature of the traction portion of the traction surface is high, to thereby exhibit high traction coefficient even in the high-temperature operating condition.

14 Claims, 8 Drawing Sheets

TOROIDAL-TYPE CONTINUOUSLY VARIABLE TRANSMISSION FOR AUTOMOBILES

BACKGROUND OF THE INVENTION

1. Field of the Invention

The present invention relates to a toroidal-type continuously variable transmission (CVT) for automobiles, which is used to continuously control change gear ratio, and more specifically to a surface roughness structure of rolling elements of the toroidal-type CVT, such as an input disk, an output disk and a power roller.

U.S. Pat. No. 5,676,618 discloses one example of the toroidal-type CVT, which is incorporated herein by reference.

FIG. 1 shows the basic structure of the toroidal-type CVT. The toroidal-type CVT includes a plurality of metal rolling elements contacting one another through a traction oil film. The rolling elements include input disk 3 connected with input shaft 1, output disk 5 connected with output shaft 2, and power rollers 6, 6 interposed between input disk 3 and output disk 5 and rotatable to transmit rotational force from input disk 3 to output disk 5. Each power roller 6 has a tiltable roller shaft such that power roller 6 is inclined relative to input and output disks 3 and 5 when the roller shaft tilts. Power roller 6 is contacted with input disk 3 and output disk 5 through a traction oil. When power roller 6 is inclined, the contact between power roller 6 and input and output disks 3 and 5 shifts. This changes the ratio of the torque radius of input disk 3 to that of output disk 5 to thereby continuously change the transmission ratio.

Table 1 shows one example of the results of measurement of a surface structure or texture, specifically, a surface roughness, of the mutually contact surfaces of input and output disks 3 and 5 and power roller 6 of the toroidal-type CVT, which surfaces are hereinafter referred to as traction surfaces.

TABLE 1

| Surface structure | Measurement results |
| --- | --- |
| Ra (JIS B0601) | 0.018 μm |
| Rq | 0.022 μm |
| Mr2 (DIN4776) | 86.67% |
| Rk (DIN4776) | 0.055 μm |
| Rvk (DIN4776) | 0.027 μm |
| Vo | $1.8 \times 10^{-6}$ mm$^3$/mm$^2$ |
| K | 0.54 |

Generally, the traction surfaces of the rolling elements of the toroidal-type CVT in the earlier technique have the surface structure in which arithmetical mean roughness Ra prescribed by JIS B0601-1994 is not more than 0.05 μm, root-mean-square roughness Rq is not more than 0.07 μm, oil retention volume Vo is not more than $1.3 \times 10^{-5}$ mm$^3$/mm$^2$, and oil retention depth ratio K is less than 0.9.

If the surface roughness of the traction surfaces of the rolling elements exceeds a certain value relative to a thickness of the traction oil film formed between input and output disks 3 and 5 and power roller 6, rolling-fatigue lives of input and output disks 3 and 5 and power roller 6 are deteriorated so that durability of the CVT decreases. Therefore, the traction surfaces are subjected to grinding and super-finishing such that the surface roughness is limited to a sufficiently small level in height, that is, arithmetical mean roughness Ra of not more than 0.05 μm. Here, as prescribed in JIS B 0601, arithmetical mean roughness Ra is determined as the value obtained by the following formula and expressed in micrometer (μm) when sampling only the reference length L from the roughness curve in the direction of mean line, taking X-axis in the direction of mean line and Y-axis in the direction of longitudinal magnification of this sampled part and the roughness curve is expressed by y=f(x):

$$Ra = \frac{1}{L}\int_0^L |f(x)|d(x) \quad (1)$$

where L is reference length.

Namely, arithmetical mean roughness Ra means the mean deviation obtained by dividing the area defined by the roughness curve f(x) and the mean line, i.e., X-axis, as shown in FIG. 2A, by the reference length L.

Root-mean-square roughness Rq is determined as the value obtained by the following formula and expressed in micrometer (μm) when sampling only the reference length L from the roughness curve in the direction of mean line, taking X-axis in the direction of mean line and Z-axis in the direction of longitudinal magnification of this sampled part and the roughness curve is expressed by z=f(x):

$$Rq = \sqrt{\frac{1}{L}\int_0^L f^2(x)d(x)} \quad (2)$$

where L is reference length.

Namely, root-mean-square roughness Rq means the square root of the mean deviation obtained by dividing the area defined by the mean line (X-axis) and the curve obtained by squaring the distance between the roughness curve f(x) and the mean line (X-axis), as shown in FIG. 2B, by the reference length L.

DIN4776 defines parameters Mr1, Mr2, Rpk, Rvk and Rk for evaluation of lubricating characteristic of a surface structure, based on an initial wear part, a substantial contact part, and an oil retention part, which are separated from a bearing curve (material ratio curve). Parameters Mr1, Mr2, Rpk, Rvk and Rk are determined as follows.

(1) Mr1: Material Portion 1

Level, in percent, determined for the intersection line which separates peaks from roughness profile and cooperates with Mr2 described later to determine the roughness core profile which is roughness profile excluding the peaks and deep valleys (see FIG. 3). Mr1 is calculated as follows. As shown in the right part of FIG. 3, slope line SLsg includes the secant line of material ratio curve MrC over 40% of the material ratio which shows the smallest gradient. This is determined by moving the secant line for ΔMr=40% along material ratio curve MrC. Intersection of a lower limit line at Mr=0% and slope line SLsg with the smallest gradient is indicated at a. Intersection of material ratio curve MrC and a horizontal line passing through intersection a is indicated at c. Material ratio at intersection c is expressed by Mr1 (%). Mr1 indicates the material portion after initial wear.

(2) Mr2: Material Portion 2

Level, in percent, determined for the intersection line which separates deep valleys from the roughness profile (see FIG. 3). Mr2 is calculated as follows. As illustrated in FIG. 3, intersection of an upper limit line at Mr=100% and slope line SLsg with the smallest gradient is indicated at b. Intersection of material ratio curve MrC and a horizontal line passing through intersection b is indicated at d. Material ratio at intersection d is represented by Mr2 (%). Mr2 indicates the material portion after long-period wear.

(3) Rpk: Reduced Peak Height

Average height of the peaks above the roughness core profile. In FIG. 3, if an area of a right triangle formed by base ac and a side lying on the lower limit line Mr=0% is equal to an area defined by the lower limit line Mr=0%, base ac and material ratio curve MrC, the height of the right triangle is expressed as Rpk ($\mu$m). In other words, the distance between intersection a and a vertex of the right triangle which is located on the lower limit line Mr=0% is represented by Rpk ($\mu$m). Rpk indicates a height of initial wear.

(4) Rvk: Reduced Valley Depth

Average depth of the profile valleys projecting through the roughness core profile. In FIG. 3, if an area of a right triangle formed by base bd and a side lying on the upper limit line Mr=100% is equal to an area defined by the upper limit line Mr=100%, base bd and material ratio curve MrC, the height of the right triangle, namely, the distance between intersection b and a vertex of the right triangle which is located on the upper limit line Mr=100%, is represented by Rvk ($\mu$m). Rvk indicates a depth of oil retention valley.

(5) Rk: Core Roughness Depth

Height difference between intersections c and d is represented by Rk ($\mu$m). Rk indicates a height of long-period wear which is reduced by wear during a long period until the surface is worn out to unuseable state.

Vo and K are determined as follows.

Vo: oil retention volume

Vo is represented by the following formula:

$$Vo=[(100-Mr2)\times Rvk]/200000 (mm^3/mm^2) \quad (3)$$

Vo indicates a volume of oil retained in oil retention depth Rvk per 1 mm$^2$ (see FIG. 4).

K: oil retention depth ratio

K is a ratio of oil retention depth Rvk to core roughness depth Rk and represented by the following formula:

$$K=Rvk/Rk \text{(dimensionless number)} \quad (4)$$

As oil retention depth ratio K increases, lubrication characteristic of the surface becomes better.

SUMMARY OF THE INVENTION

Automobiles are required to operate under various environmental conditions in which the CVTs tend to operate with a traction oil having the remarkably wide temperature range from approx. −30° C. to approx. 120° C. Since the traction oil must maintain a good fluidity at the extremely low temperature, the viscosity of the traction oil at high temperature becomes much lower. Therefore, if the surface roughness of the traction surfaces of input and output disks 3 and 5 and power roller 6 of the above-described CVT is sufficiently small with respect to the thickness of the traction oil film formed therebetween, a force transmittable between the traction surfaces relative to a pressing force applied to the traction surfaces decreases along with the temperature rise at the traction surfaces. For instance, if surface roughness Ra is 0.5 $\mu$m or less as explained in the above-described earlier technique with respect to the traction oil film having the thickness of about 0.2 $\mu$m, the transmission force relative to the pressing force becomes small as the temperature at the traction surfaces increases. In order to transmit a driving force regardless temperature conditions upon operation of the CVTs, it is necessary to apply such a large pressing force as to produce a sufficiently large transmission force between the traction surfaces even at high temperature.

The ratio of the transmission force to the pressing force is traction coefficient. Accordingly, if the traction coefficient is small, a large pressing force will be required to be applied to the rolling elements for obtaining a predetermined transmission force. Then, respective components will be increased in weight in order to assure the strength of the components against the large pressing force. Further, friction loss of bearings supporting the components will increase, leading to loss of automobile power. There is a demand for eliminating such undesired possibilities in the CVT in the earlier technique.

An object of the present invention is to provide a toroidal-type continuously variable transmission (CVT) for automobiles which includes rolling elements capable of maintaining high traction coefficient even upon high-temperature operation while keeping the formation of a traction oil film as carried out in the toroidal-type CVT in the earlier technique, and capable of transmitting a large driving force without increasing the pressing force to be applied to the rolling elements of the toroidal-type CVT.

In the toroidal-type CVT of the present invention, the rolling elements have the traction surfaces having a surface microstructure defined with respect to a thickness of the traction oil film formed under the operating condition that the temperature of a traction portion of each traction surface is relatively high. The toroidal-type CVT of the present invention, therefore, can serve for maintaining rolling-fatigue lives of the rolling elements as kept in the rolling elements of the toroidal-type CVT in the earlier technique. The toroidal-type CVT of the present invention also can serve for reducing the pressing force, so that the components of the CVT can be prevented from the increase in weight that is caused due to increase in the pressing force. Further, the toroidal-type CVT of the present invention can contribute to suppression of friction loss at bearings supporting the components to thereby reduce loss of automobile power.

According to one aspect of the present invention, there is provided a toroidal-type continuously variable transmission for automobiles, comprising:

a plurality of rolling elements having traction surfaces cooperating with each other to transmit a power between the rolling elements via a traction oil film formed between the traction surfaces, wherein a ratio h/Rqsyn is not more than 3.0 when an oil retention depth ratio K of at least one of the traction surfaces is not less than 0.9, and an oil retention volume Vo of the at least one of the traction surfaces is not less than 7×10$^{-6}$ mm$^3$/mm$^2$, where h is a thickness of the traction oil film formed under the operating condition, and Rqsyn is a root-sum-square value of root-mean-square roughness values Rq of the traction surfaces. Ratio h/Rqsyn is preferably not more than 1.0. Ratio h/Rqsyn is more preferably in a range of 0.2–1.0. Thickness h of the traction oil film is calculated on the basis of dimension and material characteristics of the traction surfaces, temperature condition, operating condition of the continuously variable transmission, and viscosity characteristics of the traction oil according to an elastohydrodynamic lubrication theory. Thickness h of the traction oil film can be calculated using the equation of Hamrock and Dowson:

$$H=3.42\, gv^{0.49}gE^{0.17}(1-e^{-0.68\,k})$$

where $H = (h/R_x)(W/U)$ $g_v = GW^3/U^2$ $g_E = W^{8/3}/U^2$ $k = (R_y/R_x)^{2/\pi}$ $U = \eta_o u/(E'R_x)$ $W = w/(E'R_x^2)$ $G = \alpha E'$ where H is a parameter of a film thickness, gv is a parameter of viscosity, gE is a parameter of elasticity, and k is a parameter of ellipse, Rx is an equivalent radius of curvature in a rolling direction of the traction portion of the traction surface, W is a parameter of load, U is a parameter of speed, G is a parameter of material, Ry is an equivalent radius of curvature in a direction perpendicular to the rolling direction of the traction portion of the traction surface, ηo is an oil viscosity under atmospheric pressure, u is a rolling speed of the traction portion of the traction surface, E' is an equivalent vertical elastic coefficient of the traction portion of the traction surface, w is a pressing force applied to the traction portion of the traction surface, and α is a pressure viscosity coefficient. The operating condition may be the condition that an engine output is maximum and a temperature of a traction oil to be supplied to the traction surfaces is highest.

According to a further aspect of the present invention, there is provided a toroidal-type continuously variable transmission for automobiles, comprising:

a plurality of rolling elements having traction surfaces cooperating with each other to transmit a power between the rolling elements via a traction oil film formed between the traction surfaces, wherein an oil retention depth ratio K of at least one of the traction surfaces is not less than 0.9 and a ratio h/Vosyn is not more than 15.0, where h is a thickness of the traction oil film formed under the operating condition, and Vosyn is a root-sum-square value of oil retention volumes Vo of the traction surfaces. Ratio h/Vosyn is preferably not more than 5.0. Further, thickness h of the traction oil film can be calculated using an elastohydrodynamic lubrication theory on the basis of dimension and material characteristics of the traction surfaces, temperature condition, operating condition of the toroidal-type CVT, and viscosity characteristics of the traction oil according to an elastohydrodynamic lubrication theory. Thickness h of the traction oil film can be calculated using the equation of Hamrock and Dowson. The operating condition is the condition that an engine output is maximum and a temperature of the traction oil to be supplied to the traction surfaces is highest.

According to a still further aspect of the present invention, there is provided a toroidal-type continuously variable transmission for automobiles, comprising:

a plurality of rolling elements having traction surfaces cooperating with each other to transmit a power between the rolling elements via a traction oil film formed between the traction surfaces, wherein an oil retention depth ratio K of at least one of the traction surfaces is not less than 0.9, an oil retention volume Vo of the at least one of the traction surfaces is not less than $7 \times 10^{-6}$ mm$^3$/mm$^2$, and a root-sum-square value Rqsyn of root-mean-square roughness values Rq of the traction surfaces is not less than 0.07 μm. Root-sum-square value Rqsyn is preferably not less than 0.2 μm. Root-sum-square value Rqsyn is more preferably in a range of 0.2–1.0 μm from a viewpoint of durability.

According to a still further aspect of the present invention, there is provided a toroidal-type continuously variable transmission for automobiles, comprising:

a plurality of rolling elements having traction surfaces cooperating with each other to transmit a power between the rolling elements via a traction oil film formed between the traction surfaces, wherein an oil retention depth ratio K of at least one of the traction surfaces is not less than 0.9 and a root-sum-square value Vosyn of oil retention volumes Vo of the traction surfaces is not less than $1.3 \times 10^{-5}$ mm$^3$/mm$^2$. Root-sum-square value Vosyn is preferably not less than $4 \times 10^{-5}$ mm$^3$/mm$^2$.

DETAILED DESCRIPTION OF THE PREFERRED EMBODIMENTS

Referring now to FIGS. 5–10, the toroidal-type CVT of the present invention is explained.

Figure 5:
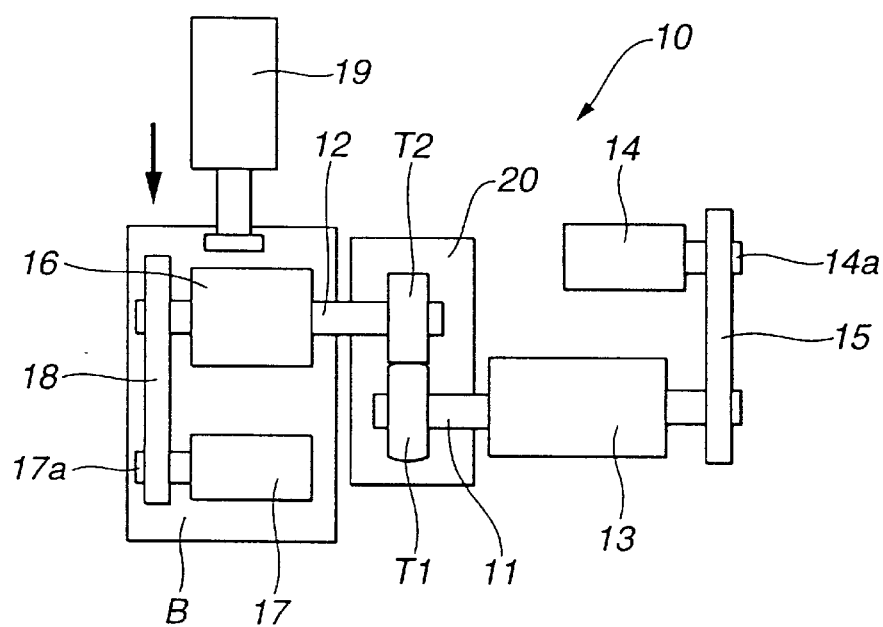
FIG. 5 is a schematic diagram showing a two-cylinder rolling tester used for observing traction performance affected by the surface structure of traction surfaces of rolling elements of the toroidal-type CVT.

FIG. 5 illustrates two-cylinder rolling tester 10 for carrying out rolling and sliding contact between two rolling elements T1 and T2 as test pieces.

As illustrated in FIG. 5, two-cylinder rolling tester 10 includes primary shaft 11 that supports rolling element T1 and subsidiary shaft 12 that supports rolling element T2. Torque sensor 13 is provided on primary shaft 11. Primary shaft timing belt 15 is spanned on primary shaft 11 and motor shaft 14a of servo motor 14. Subsidiary shaft 12 is rotatably supported by bearing 16 fixed on sliding base B. Sliding base B is movable in a direction perpendicular to the axial direction of subsidiary shaft 12. Subsidiary shaft 12 is connected with motor shaft 17*a* of servo motor 17 fixed on sliding base B, through subsidiary shaft timing belt 18 spanned on subsidiary shaft 12 and motor shaft 17*a*. Rolling element T2 supported on subsidiary shaft 12 is moved together with sliding base B and servo motor 17 by pressing sliding base B in the direction indicated by arrow of FIG. 5, with air cylinder 19. Rolling elements T1 and T2 thus come into rolling contact with each other in oil bath 20. Traction coefficient is calculated by measuring the torque generated at primary shaft 11 by torque sensor 13 provided on primary shaft 11 of the power transmission system on the rolling element T1 side.

Rolling element T1 was made of SCM420H steel (chromium molybdenum steel prescribed in JIS G 4052) subjected to carburizing-quenching-tempering, and formed by grinding and super finishing to a generally cylindrical shape having a diameter of 40 mm, a thickness of 20 mm and a crowning-shaped traction surface having R (radius) of 700 mm. The microstructure of the traction surface had arithmetical mean roughness Ra of 0.021 $\mu$m, root-mean-square roughness Rq of 0.03 $\mu$m, oil retention volume Vo of $1.8 \times 10^{-6}$ mm$^3$/mm$^2$, and oil retention depth ratio K of 0.54. The microstructure of the traction surface was measured using a tracer type surface roughness tester at a cutoff of 0.08 mm and a measuring length of 0.4 mm.

A plurality of rolling elements T2 were prepared. Rolling elements T2 were made of SCM420H steel subjected to carburizing-quenching-tempering, and formed by various working processes to cylindrical shapes having a diameter of 40 mm, a thickness of 20 mm and cylindrical traction surfaces having different microstructures. The microstructure of the traction surface of rolling element T2 was measured in the same manner as described above with respect to rolling element T1.

A set of thus-produced rolling element T1 and each of rolling elements T2 were installed in two-cylinder rolling tester 10 shown in FIG. 5, and the rolling and sliding test was conducted to measure the traction generated at the traction surfaces of rolling elements T1 and T2 and a rate of formation of the traction oil film formed therebetween.

Conditions of the rolling and sliding test using two-cylinder rolling tester 10 was as follows. The slide/roll ratio was 0–5%. The mean rolling velocity was 0.52–5.2 m/s. The mean shaft rotation number was 250–2500 rpm (the arithmetical mean of the rotation numbers of primary shaft 11 and subsidiary shaft 12). The mean rolling velocity was made constant by uniformly applying a differential to primary shaft 11 and subsidiary shaft 12. The traction oil in oil bath 20 was set at 100° C. The vertical load generated by the pressure applied by air cylinder 19 was set at 147 N. The traction oil film formation rate was determined as a parameter of metal-to-metal contact of the traction surfaces of rolling elements T1 and T2 during the operation. The metal-to-metal contact state of the traction surfaces of rolling elements T1 and T2 were monitored by electric resistance method during the rolling and sliding test. The traction oil film formation rate is defined as a ratio of electric potential difference between the traction surfaces which was measured at the metal contact state, to electric potential difference therebetween when there was no metal-to-metal contact, was obtained.

Figure 6:
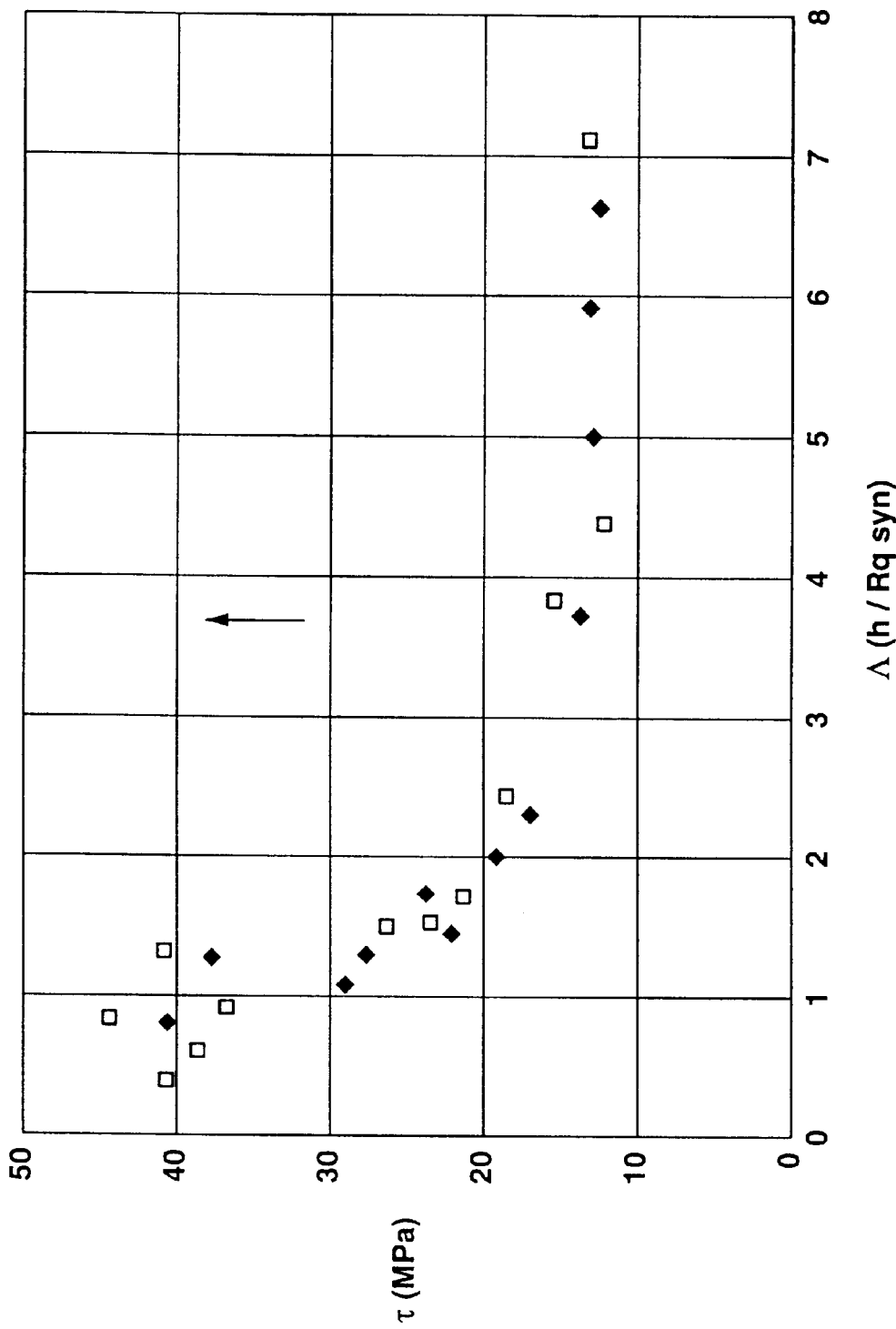
FIG. 6 is a graph showing a relationship between oil film thickness ratio Λ (h/Rqsyn) and traction stress.

FIG. 6 shows a relationship between traction stress $\tau$ obtained from the results of the rolling and sliding test, and traction oil film thickness ratio $\Lambda$ of traction oil film thickness h to surface roughness Rqsyn. Traction stress $\tau$ is the value obtained by dividing a traction force by an area of the traction portion of the traction surface. Traction oil film thickness ratio $\Lambda$ is expressed by the following formula:

$$\Lambda = h/\text{Rqsyn} \tag{5}$$

where h is a thickness ($\mu$m) of the traction oil film, and Rqsyn is a surface roughness of the traction surface of each rolling element T1 and T2 and obtained as a root-sum-square of root-mean-square roughness values Rq ($\mu$m) of the traction surfaces of rolling elements T1 and T2. In FIG. 6, ♦ shows the traction surfaces formed with dimples in Example 1 and □ shows those subjected to superfinishing in Example 2. Traction stress $\tau$ becomes better in the direction indicated by the arrow of FIG. 6.

Traction oil film thickness h is obtained by the following equation of Hamrock and Dowson (B. J. Hamrock & D. Dowson, Proc. 5th Leeds-Lyon Symp. (1978) 22):

$$H = 3.42 \, gv^{0.49} gE^{0.17} (1 - e^{-0.68 \, k}) \tag{6}$$

where $H = (h/Rx)(W/U)$ $gv = GW^3/U^2$ $gE = W^{8/3}/U^2$ $k = (Ry/Rx)^{2/\pi}$ $U = \eta o u/(E'Rx)$ $W = w/(E'Rx^2)$ $G = \alpha E'$ where H is a parameter of a film thickness, gv is a parameter of viscosity, gE is a parameter of elasticity, and k is a parameter of ellipse, Rx is an equivalent radius of curvature (m) in a rolling direction of the traction portion of the traction surface, W is a parameter of load, U is a parameter of speed, G is a parameter of material, Ry is an equivalent radius of curvature (m) in a direction perpendicular to the rolling direction of the traction portion of the traction surface, $\eta o$ is an oil viscosity under atmospheric pressure, u is a rolling speed (m/s) of the traction portion of the traction surface, E' is an equivalent vertical elastic coefficient (GPa) of the traction portion of the traction surface, w is a pressing force (N) applied to the traction portion of the traction surface, and $\alpha$ is a pressure viscosity coefficient (GPa$^{-1}$).

The equation of Hamrock and Dowson determines the relationship between dimensionless parameter and oil film thickness on the basis of an elastohydrodynamic lubrication (EHL) theory. The EHL theory is at present a most accurate method of calculating an actual oil film thickness. The EHL theory is based on the pressure-dependency of elastic deformation and lubricating oil viscosity of lubricated surfaces or parts. In general, the EHL theory gives generated pressure and lubricated surface configuration as a solution by simultaneously using Reynolds equation, the formula expressing a relationship between stress and strain on the lubricated surface (a relationship between pressure and lubricated surface deformation), and the formula expressing a relationship between pressure and lubricating oil viscosity.

The test results shown in FIG. 6 reveal that, regardless the configuration of surface roughness of the traction surfaces, if traction oil film thickness ratio $\Lambda$ is not more than 3, traction stress $\tau$ increases. Especially, if traction oil film thickness ratio $\Lambda$ is not more than 1, traction stress $\tau$ is the maximum.

Figure 7:
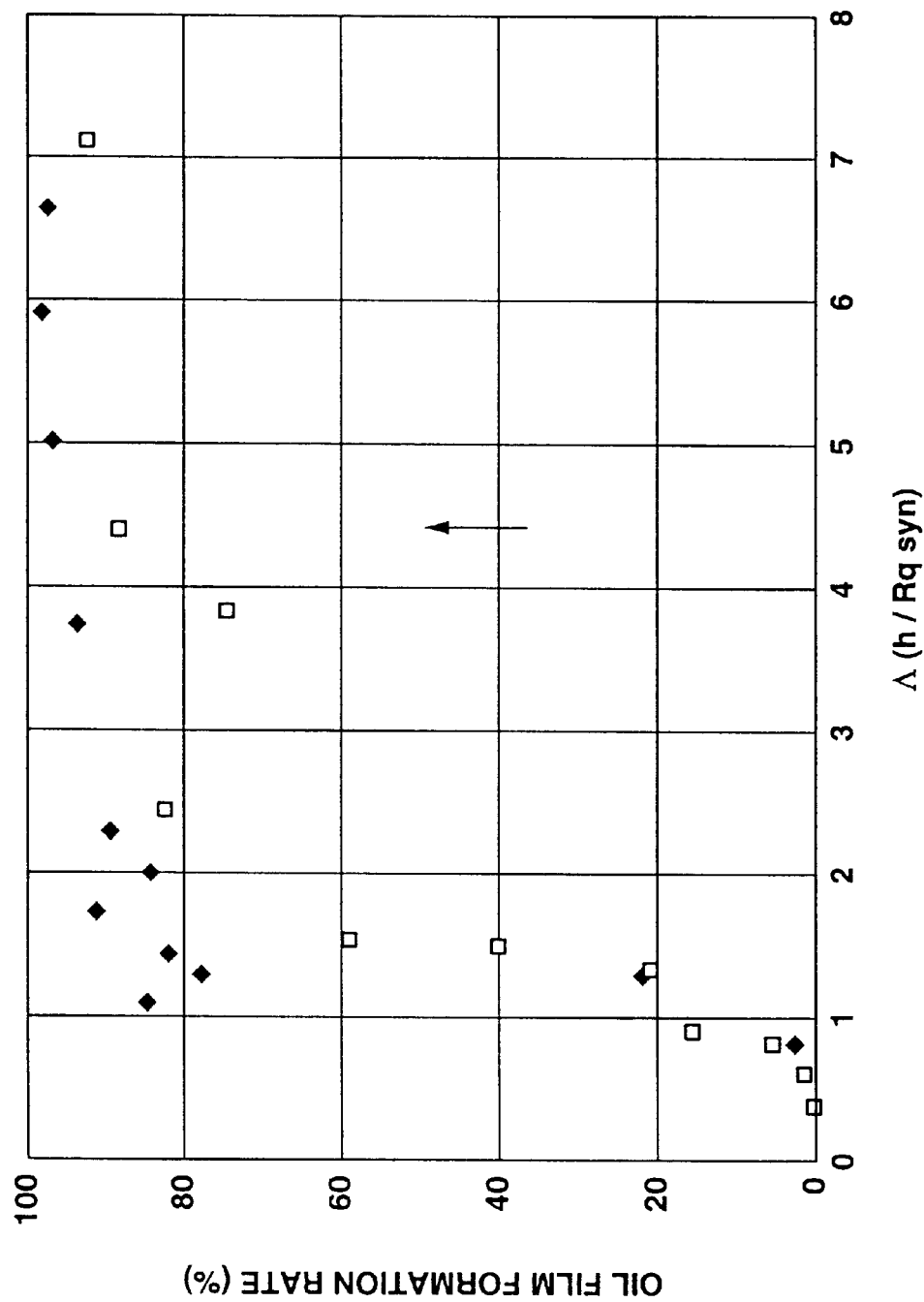
FIG. 7 is a graph showing a relationship between oil film thickness ratio Λ (h/Rqsyn) and an oil film formation rate.

FIG. 7 shows a relationship between a traction oil film formation rate and traction oil film thickness ratio Λ. In FIG. 7, the traction oil film formation rate becomes better in the direction indicated by the arrow. It has been found that the traction oil film formation rate is affected by the configuration of surface roughness of the traction surfaces.

Figure 8:
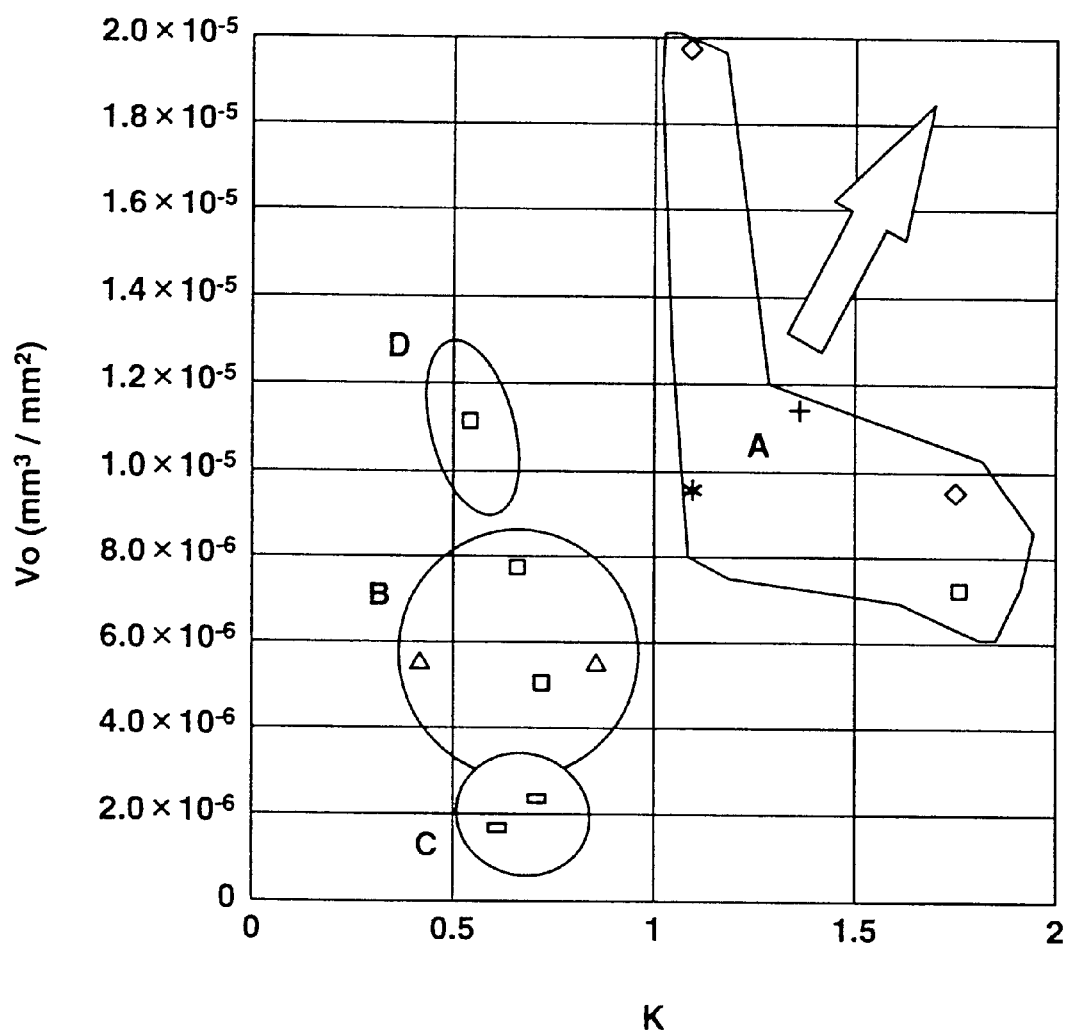
FIG. 8 is a graph showing a relationship between oil retention volume Vo and oil retention depth ratio K.

FIG. 8 shows groups A to D into which the microstructure of the traction surfaces are classified based on oil retention volume Vo and oil retention depth ratio K. As oil retention depth ratio K increases, a peak of the surface roughness of the traction surface becomes flatter and a valley thereof becomes deeper. Group A includes the microstructure having oil retention depth ratio K of not less than 0.9 and oil retention volume Vo of not less than $7 \times 10^{-6}$ mm$^3$/mm$^2$. The microstructure having oil retention depth ratio K of less than 0.9 are classified into groups D, B and C on the basis of oil retention volume Vo such that the value of oil retention volume Vo is decreased in this order. The microstructure of group A has the relatively larger oil retention volume Vo as well as the larger oil retention depth ratio K as compared with those of the other groups. This indicates that if oil retention volume Vo is large, an absolute value of the valley depth of the surface roughness will be large.

Figure 9:
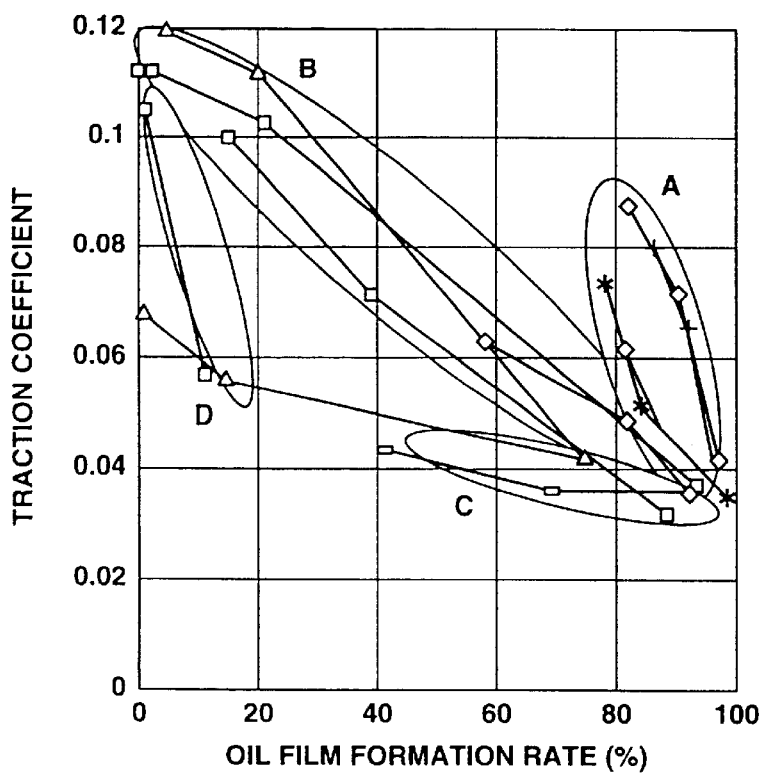
FIG. 9 is a graph showing a relationship between an oil film formation rate and traction coefficient with respect to groups shown in FIG. 8.

FIG. 9 shows a relationship between traction coefficient and the traction oil film formation rate, which is expressed by groups A–D corresponding to those of FIG. 8. It has been recognized that group A exhibits the large traction coefficient and the high rate of traction oil film formation, as compared with groups B–D. That is, if the traction surface has the microstructure of group A, the high rate of traction oil film formation can be kept even when the traction oil film thickness is small, namely, the traction coefficient is large. Accordingly, if the microstructure of the traction surface is formed so as to have oil retention depth ratio K of not less than 0.9 and oil retention volume Vo of not less than $7 \times^{-6}$ mm$^3$/mm$^2$ as exhibited in group A, the high rate of traction oil film formation can be kept with the large traction coefficient.

The above-described characteristics of the microstructure of the traction surface will be explained on the basis of the following mechanisms.

First, the relationship between traction oil film thickness ratio Λ (h/Rqsyn) and traction stress τ as shown in FIG. 6 will be given by the following reason. If traction oil film thickness ratio Λ becomes small, metal-to-metal contact or boundary friction larger than fluid friction will occur on tip ends of peaks of the surface roughness, causing a large apparent traction. The characteristics of the microstructures classified into groups B–D except group A as shown in FIG. 8, can be explained by this mechanism because the increase in apparent traction occurs in association with increase in metal-to-metal contact.

On the other hand, the characteristic of the microstructure of group A as shown in FIG. 8 will be explained on the basis of the following mechanism. The above-described rolling and sliding test was carried out under the condition that the traction oil had a viscous characteristic which was non-linear relative to a shearing rate. Fluid friction stress (traction stress) occurs depending on the shearing rate. Upon the rolling and sliding contact of the traction surfaces by the actual tester, such a traction stress also occurs at high temperature at which the traction coefficient decreases. Here, if traction oil film thickness ratio Λ is small, the traction oil film thickness will become locally small at tip end portions of the peaks of the surface roughness, so that the shearing rate as an inverse number of the traction oil film thickness will locally extremely increase. This will cause the fluid friction stress (traction stress) to exceed the boundary film strength (boundary friction stress). It is considered that even if the fluid film is disposed between the surfaces of components so as not to cause metal-to-metal contact, the stress equivalent to at least the boundary film strength can be locally caused. Further, if the microstructure of the traction surface is substantially the same as that of group A in which oil retention depth ratio K is large, the tip end portions of the peaks of the surface roughness are flatter and the valleys thereof are deeper, there will exist a large region where the traction oil film thickness at the tip end portions of the peaks of the surface roughness is locally small and the shearing rate is locally extremely large. Furthermore, it will be suggested that, owing to the flatter tip end portions of the peaks of the surface roughness, the shearing rate is reduced and metal-to-metal contact is unlikely to occur.

Accordingly, in the toroidal-type CVT of the present invention, the rolling elements have the traction surfaces having the microstructure discussed above, so that metal-to-metal contact of the traction surfaces can be suppressed and the traction coefficient can be improved even at high temperature.

Figure 10:
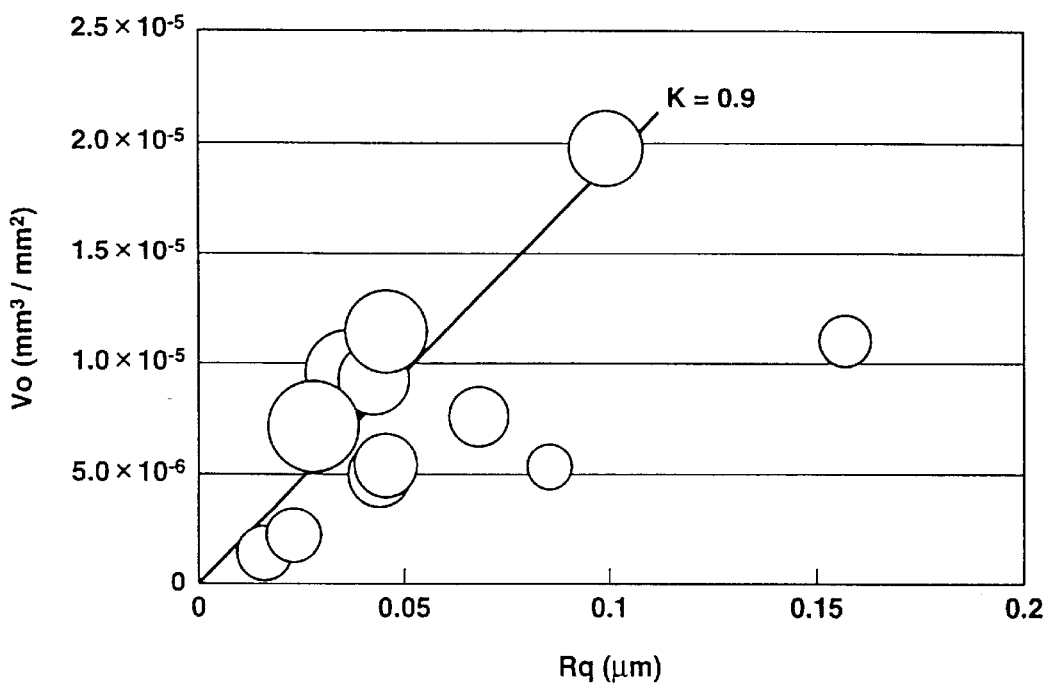
FIG. 10 is a graph showing a relationship between root-mean-square roughness Rq and oil retention volume Vo.

FIG. 10 shows a relationship between root-mean-square roughness value Rq (μm) and oil retention volume Vo (mm$^3$/mm$^2$), in which a magnitude of oil retention depth ratio K is indicated in proportion to a size of a plot. As shown in FIG. 10, if the sizes of plots, i.e., magnitudes of oil retention depth ratio K, are the same, root-mean-square roughness value Rq and oil retention volume Vo are proportional to each other. Hence, the following consideration has been made on the basis of the relationship between traction stress τ and traction oil film thickness ratio Λ (h/Rqsyn) as shown in FIG. 6. As oil retention volume Vo becomes large to a certain extent, traction stress τ and the traction coefficient increase. As seen from FIG. 10, when oil retention depth ratio K is 0.9, root-mean-square roughness Rq (mm) is equivalent to five times oil retention volume Vo. If oil retention depth ratio K is not less than 0.9, ratio h/Vosyn of traction oil film thickness h to root-sum-square value Vosyn of oil retention volumes Vo will be 15.0 when traction oil film thickness ratio Λ (h/Rqsyn) is 3.0 in FIG. 6.

If oil retention depth ratio K is not less than 0.9, the traction oil film formation rate can be kept high even when traction oil film thickness h becomes small. Further, if ratio h/Vosyn is not more than 15.0, traction stress τ and the traction coefficient will increase. Namely, in a case where the microstructure of the traction surfaces is constructed such that ratio h/Vosyn is not more than 15.0 under the operating condition that the temperature of the traction portion of each traction surface is highest, the traction coefficient can increase even at the high temperature of the traction portions. Further, in a case where the microstructure of the traction surfaces is constructed such that oil retention depth ratio K is not less than 0.9, the high rate of traction oil film formation can be kept even when the traction oil film thickness becomes small. This can serve for suppressing the occurrence of metal-to-metal contact and maintaining substantially the same rolling-fatigue lives of the rolling elements of the toroidal-type CVT as those of the rolling elements of the toroidal-type CVT in the earlier technique. These effects can also be exhibited if the microstructure of the traction surfaces is constructed such that traction oil film thickness ratio Λ (h/Rqsyn) is not more than 3.

Further, as described above, when traction oil film thickness ratio Λ (h/Rqsyn) is not more than 1, the traction coefficient as well as traction stress τ becomes larger (see FIG. 6). This can exhibit more preferable effects.

Furthermore, if traction oil film thickness ratio Λ (h/Rqsyn) is in a range of 0.2–1.0, the traction coefficient can be improved and metal-to-metal contact can be prevented. This can provide a traction drive excellent in durability. In addition, it has been found from the relationship shown in FIG. 10 that if oil retention depth ratio K is not less than 0.9, traction oil film thickness ratio Λ (h/Rqsyn) of 1.0 or less is equivalent to ratio h/Vosyn of 5.0 or less. Therefore, if the microstructure of the traction surfaces is constructed such that traction oil film thickness ratio h/Vosyn is not more than 5.0, the effects can be exhibited at maximum.

In addition, the traction oil film thickness formed at high temperature in the toroidal-type CVT for automobiles will be about 0.2 μm upon taking account of the allowable bearing pressure and heat resistance of materials of the traction surfaces, the revolution number and output limit of the engine, and the like. Therefore, if traction oil film thickness h is 0.2 μm as a constant value and traction oil film thickness ratio Λ (h/Rqsyn) is not more than 3.0, surface roughness Rqsyn can be not less than 0.07 μm. If traction oil film thickness h is 0.2 μm and ratio h/Vosyn is not more than 15.0, root-sum-square value Vosyn can be $1.3 \times 10^{-5}$ mm$^3$/mm$^2$. Further, if traction oil film thickness h is 0.2 μm and traction oil film thickness ratio Λ (h/Rqsyn) is not more than 1.0, surface roughness Rqsyn can be not less than 0.2 μm. If traction oil film thickness h is 0.2 μm and traction oil film thickness ratio Λ (h/Rqsyn) is not less than 0.2, surface roughness Rqsyn can be not more than 1.0 μm. If traction oil film thickness h is 0.2 μm and ratio h/Vosyn is not more than 5.0, root-sum-square value Vosyn can be $4 \times 10^{-5}$ mm$^3$/mm$^2$.

In the toroidal-type CVT of the invention, the microstructure of the traction surfaces of the rolling elements is constructed such that traction oil film thickness ratio h/Rqsyn is not more than 3.0 when oil retention depth ratio K of at least one of the traction surfaces is not less than 0.9 and oil retention volume Vo of the at least one of the traction surfaces is not less than $7 \times 10^{-6}$ mm$^3$/mm$^2$, where h is a thickness (μm) of the traction oil film formed under the operating condition that a temperature of a traction portion of each traction surface is highest, and Rqsyn is a root-sum-square value of root-mean-square roughness values Rq (μm) of the traction surfaces. The toroidal-type CVT of the invention can suppress metal-to-metal contact of the traction surfaces, serving for maintaining substantially the same rolling-fatigue lives of the rolling elements of the toroidal-type as those of the rolling elements of the toroidal-type CVT in the earlier technique. The toroidal-type CVT of the invention can also keep high traction coefficient even upon high-temperature operation of the CVT, serving for transmitting a large driving force without increasing the pressing force to be applied to the traction portions of the traction surfaces. Further, in the toroidal-type CVT of the invention, traction oil film thickness ratio h/Rqsyn may be not more than 1.0. In this case, the toroidal-type CVT of the invention can more stably exhibit the effects described above. Furthermore, in the toroidal-type CVT of the invention, traction oil film thickness ratio h/Rqsyn may be in a range of 0.2–1.0, so that traction coefficient can be improved and metal-to-metal contact of the traction surfaces can be suppressed. The toroidal-type CVT of the invention, therefore, can be increased in durability.

In the toroidal-type CVT of the invention, the microstructure of the traction surfaces of the rolling elements is constructed such that oil retention depth ratio K of at least one of the traction surfaces is not less than 0.9 and ratio h/Vosyn is not more than 15.0, where h is a thickness (mm) of the traction oil film formed under the operating condition that a temperature of a traction portion of each traction surface is highest, and Vosyn is a root-sum-square value of oil retention volumes Vo (mm$^3$/mm$^2$) of the traction surfaces. Ratio h/Vosyn of not more than 15.0 corresponds to traction oil film thickness ratio h/Rqsyn of not more than 3.0, whereby the same effects as described above in the former case can be exhibited in the latter case. Further, ratio h/Vosyn may be not more than 5.0. This corresponds to traction oil film thickness ratio h/Rqsyn of not more than 1.0, whereby there can be more stably exhibited the same effects as in the case of traction oil film thickness ratio h/Rqsyn of not more than 1.0.

In the toroidal-type CVT of the invention, thickness h of the traction oil film is calculated on the basis of dimension and material characteristics of the traction surfaces, temperature condition, operating condition of the continuously variable transmission, and viscosity characteristics of the traction oil according to the EHL theory. Further, thickness h of the traction oil film is calculated using the equation of Hamrock and Dowson. Furthermore, the operating condition is the condition that an engine output is maximum and a temperature of a traction oil to be supplied to the traction surfaces is highest. The actual thickness of the traction oil film, therefore, can be calculated with remarkably high accuracy.

In the toroidal-type CVT of the invention, the microstructure of the traction surfaces of the rolling elements is constructed such that oil retention depth ratio K of at least one of the traction surfaces is not less than 0.9, oil retention volume Vo of the at least one of the traction surfaces is not less than $7 \times 10^{-6}$ mm$^3$/mm$^2$, and root-sum-square value Rqsyn of root-mean-square roughness values Rq of the traction surfaces is not less than 0.07 μm. If traction oil film thickness h is 0.2 μm as a constant value and root-sum-square value Rqsyn is not less than 0.07 μm, traction oil film thickness ratio h/Rqsyn can be not more than 3.0. Therefore, there can be exhibited in this case the same effects as described in the case of h/Rqsyn of not more than 3.0. Root-sum-square value Rqsyn may be not less than 0.2 μm. If traction oil film thickness h is the constant value and root-sum-square value Rqsyn is not less than 0.2 μm, traction oil film thickness ratio h/Rqsyn can be not more than 1.0. The toroidal-type CVT of the invention can, therefore, more stably exhibit the effects as described in the case of traction oil film thickness ratio h/Rqsyn of not more than 1.0. Root-sum-square value Rqsyn may be in a range of 0.2–1.0 μm. If traction oil film thickness h is the constant value and root-sum-square value Rqsyn is in the range of 0.2–1.0 μm, traction oil film thickness ratio h/Rqsyn can be not more than 1.0.

In the toroidal-type CVT of the invention, the microstructure of the traction surfaces of the rolling elements is constructed such that oil retention depth ratio K of at least one of the traction surfaces is not less than 0.9, and root-sum-square value Vosyn of oil retention volumes Vo of the traction surfaces is not less than $1.3 \times 10^{-5}$ mm$^3$/mm$^2$. If traction oil film thickness h is 0.2 μm, i.e., $2 \times 10^{-4}$ mm, as a constant value and root-sum-square value Vosyn is not less than $1.3 \times 10^{-5}$ mm$^3$/mm$^2$, ratio h/Vosyn can be not more than 15.0. Therefore, there can be exhibited the same effects as described in the case of ratio h/Vosyn of not more than 15.0 and, therefore, in the case of traction oil film thickness ratio h/Rqsyn of not more than 3.0. Root-sum-square value Vosyn may be not less than $4 \times 10^{-5}$ mm$^3$/mm$^2$. If traction oil film thickness h is the constant value and root-sum-square value Vosyn is not less than $4 \times 10^{-5}$ mm$^3$/mm$^2$, ratio h/Vosyn can be not more than 5.0. The toroidal-type CVT of the invention can, therefore, more stably exhibit the effects as described in the case of ratio h/Vosyn of not more than 5.0 and then in the case of traction oil film thickness ratio h/Rqsyn of not more than 1.0.

EXAMPLES

Examples 1–4 and Comparative Examples 1–2 are explained hereinafter.

Example 1

Dimple-formed Traction Surface

Figure 1:
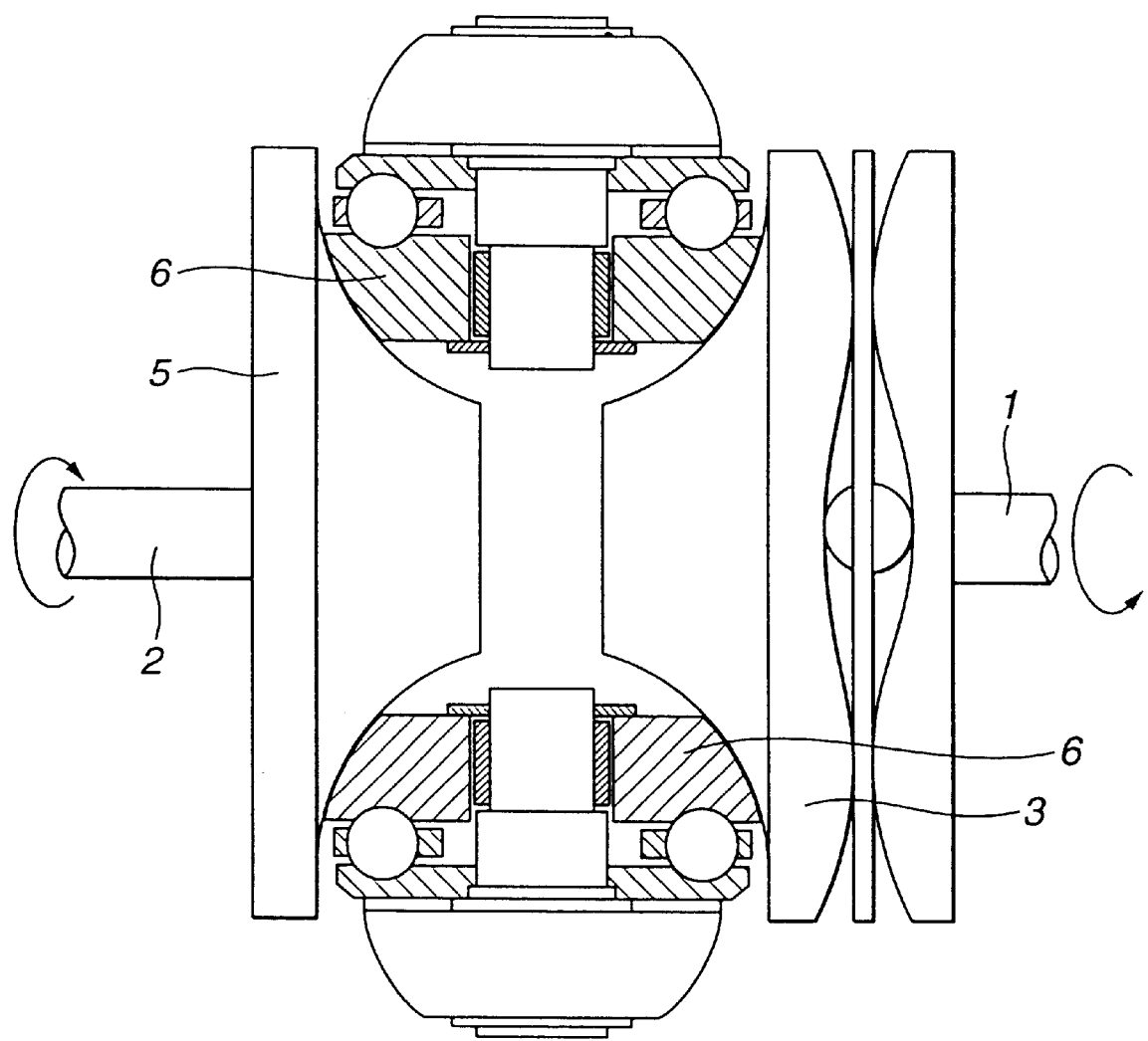
FIG. 1 is a cross-sectional view showing the basic structure of a toroidal-type continuously variable transmission (CVT)
Figure 2A:
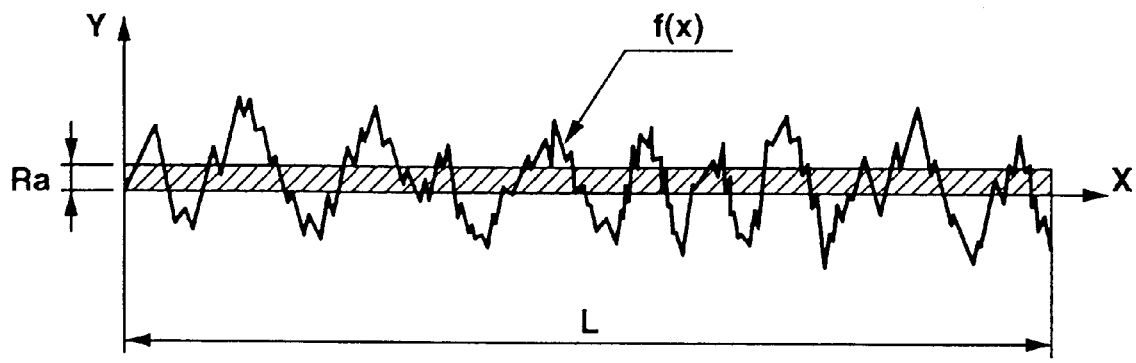
FIGS. 2A and 2B are explanatory diagrams for determination of arithmetical mean roughness Ra and root-mean-square roughness Rq, respectively.
Figure 2B:
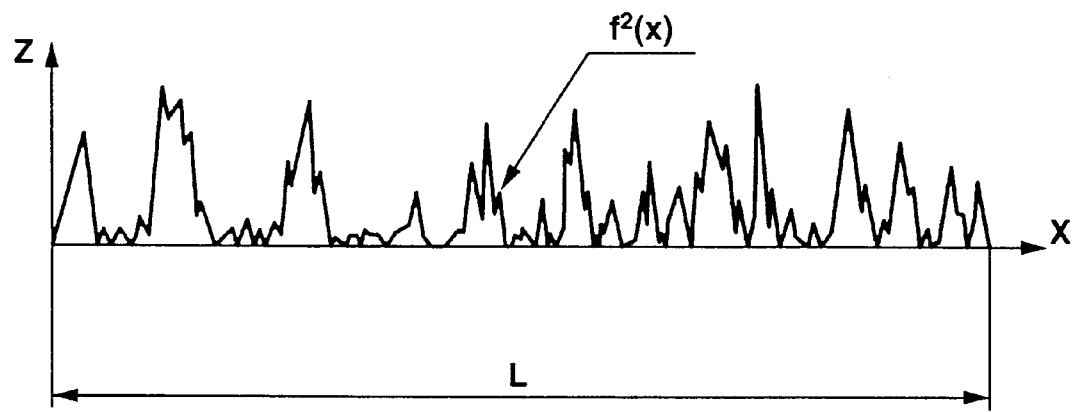
Figure 3:
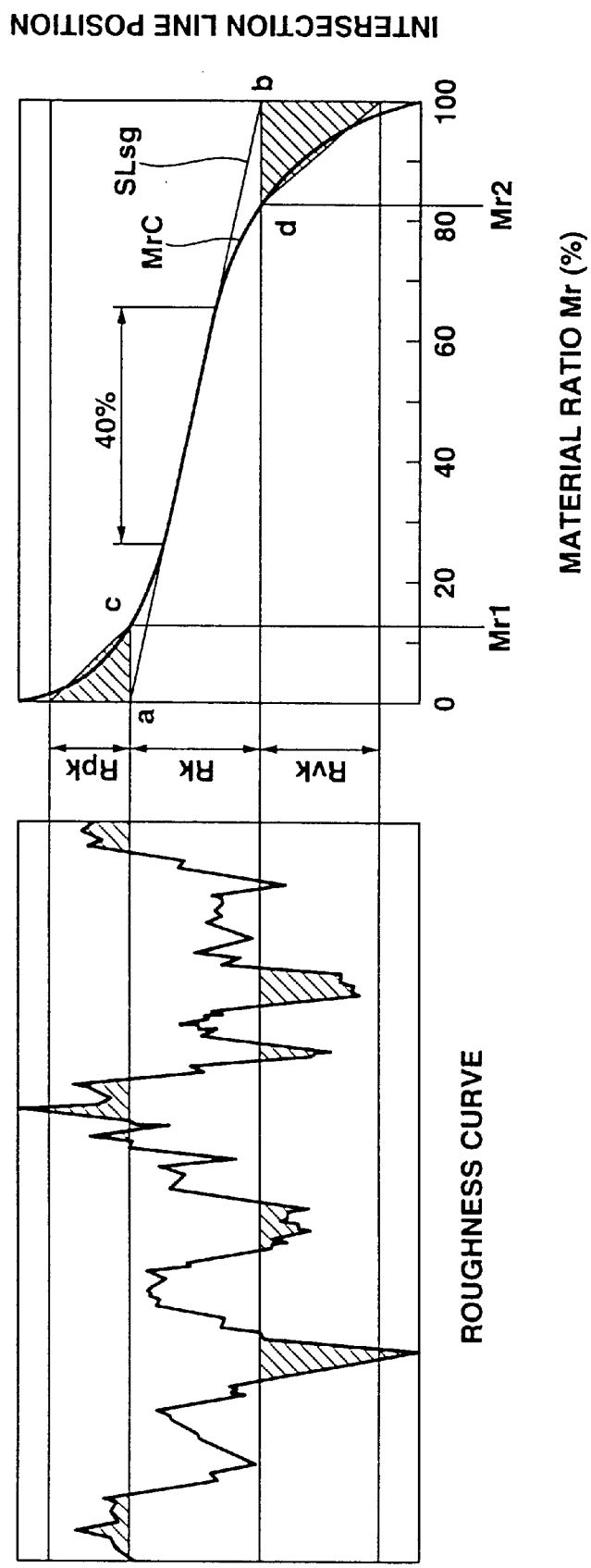
FIG. 3 is an explanatory diagram for determination of parameters such as depth of oil retention valley Rvk, core roughness depth Rk, and oil retention depth ratio K.
Figure 4:
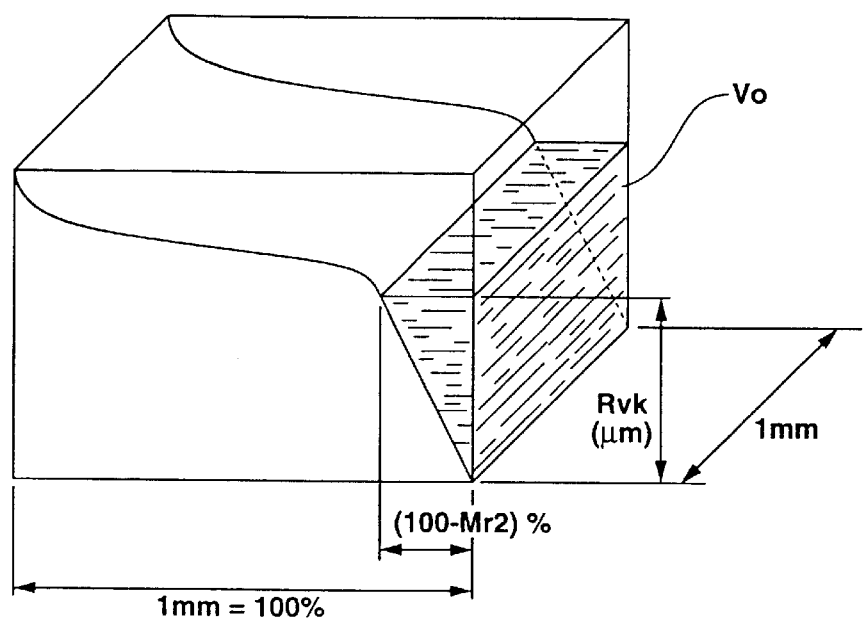
FIG. 4 is an explanatory diagram for determination of oil retention volume Vo.

Rolling elements of the toroidal-type CVT of the invention were prepared corresponding to input disk 3, output disk 5 and power rollers 6 shown in FIG. 1. The rolling elements were produced in the following manner. Workpieces made of SCM420H steel (chromium molybdenum steel prescribed by JIS G 4052) were subjected to carburizing-quenching-tempering and then to grinding, superfinishing and shot peening to be formed with traction surfaces. The shot peening was conducted by a pneumatic shot-peening machine at air pressure of 0.49 MPa (5 kg/cm$^2$) and using steel balls having Vickers hardness of Hv750 and mean particle diameter of 0.05 mm. At this time, the projector nozzle was oscillated in a direction of the axis of rotation of each workpiece while rotating the workpiece, so that an amount of ball-projection was substantially uniform over the entire surface to be formed as the traction surface. The ball-projection time was set at 20 sec. Random recesses and projections were formed in the surface by the shot peening. After the shot peening, the projections were cut away by tape lapping to thereby form dimples in the surface. The rolling elements having the traction surfaces were thus produced. A microstructure of the traction surface of each rolling elements was measured using a tracer type surface roughness tester to thereby calculate oil retention depth ratio K and oil retention volume Vo and root-mean-square roughness Rq. Results of the measurement are shown in Table 2.

A toroidal-type CVT as shown in FIG. 1 was assembled using thus-produced rolling elements. The assembled toroidal-type CVT was operated to evaluate traction coefficient as traction performance under such a condition that a temperature of the traction portion of each traction surface was highest. The operating condition was that an engine output was maximum, traction oil in an oil pan was about 120° C. due to high environmental temperature, and change gear ratio was 1:1 at which the maximum heat was generated on the traction surfaces. The evaluation results are shown in Table 2.

Under the condition described above, the temperature of the traction portion of each traction surface was approx. 150° C. at maximum. When the temperature of the traction portion is 150° C., the viscosity characteristics of the traction oil, the pressing force that is applied to the traction surface at the maximum engine output and at the change gear ratio 1:1, and the rolling speed and equivalent curvature of the traction surface are given as follows on the basis of the dimension of the CVT, and the equivalent elastic coefficient of the traction surface is given as follows on the basis of properties of the components:

Oil viscosity under atmospheric pressure η0: 2.5 (mpa·s)

Pressure viscosity coefficient α: 10.0 (GPa$^{-1}$)

Pressing force w: 34300 (N)

Rolling speed u: 28.0 (m/s)

Equivalent radius of curvature in the rolling direction Rx: 0.0286 (m)

Equivalent radius of curvature in the direction perpendicular to the rolling direction Ry: 0.0667 (m)

Equivalent vertical elastic coefficient E': 226.0 (GPa)

Ellipse parameter k=(Ry/Rx)$^{2/\pi}$: 1.71

Traction oil film thickness h was obtained by entering these values into the equation of Hamrock and Dowson as follows:

$$H = 3.42\ gv^{0.49} gE^{0.17}(1-e^{-0.68\ k})$$

where

H=(h/Rx)(W/U)

gv=GW$^3$/U$^2$ gE=W$^{8/3}$/U$^2$

U=η0u/(E'Rx)

W=w/(E'Rx$^2$)

G=αE' where

H is a parameter of a film thickness, gv is a parameter of viscosity, and gE is a parameter of elasticity, respectively. Thus-obtained traction oil film thickness h was 0.2 μm, i.e., $2 \times 10^{-4}$ mm. By using traction oil film thickness h of 0.2 μm, ratio h/Rqsyn of traction oil film thickness h to root-sum-square value Rqsyn of root-mean-square roughness values Rq of the traction surfaces, and ratio h/Vosyn of traction oil film thickness h to root-sum-square value Vosyn of oil retention volumes Vo of the traction surfaces were calculated. The calculation results are shown in Table 2.

Example 2

Superfinished Traction Surface

Rolling elements were produced in the same manner as described in Example 1. Oil retention depth ratio K, oil retention volume Vo and root-mean-square roughness Rq of the traction surfaces of thus-produced rolling elements were calculated in the same manner as described in Example 1. The calculation results are shown in Table 2. A toroidal-type CVT as shown in FIG. 1 was assembled using the rolling elements and operated to evaluate the traction coefficient under the same condition as described in Example 1. The evaluation results are shown in Table 2.

Examples 3 and 4

Groove-formed Traction Surface

Rolling elements were produced in the same manner as described in Example 1, except that, after grinding, the workpieces were subjected to ultra-precision cutting using a sintered cubic boron nitride (c-BN) tool having a round end of R (radius) of 50 μm under conditions that the cutting speed was 250 m/min, the feeding speed was 0.05 mm/rev, and the cutting depth in the radial direction was 0.02 mm. Subsequently, the projections of the surface of the workpieces were cut away by tape lapping. At this time, the tape lapping time for the respective surfaces of the workpieces was changed to adjust the machining allowance, so that grooves different in depth were formed in the surfaces, respectively. Thus, the rolling elements were produced which had traction surfaces having the microstructure of a combination of a continuous circumferential groove and top-flat lands. Oil retention depth ratio K and oil retention volume Vo and root-mean-square roughness Rq of the traction surfaces of thus-produced rolling elements were calculated in the same manner as described in Example 1. The calculation results are shown in Table 2. A toroidal-type CVT as shown in FIG. 1 was assembled using the rolling elements and operated to evaluate the traction coefficient under the same condition as described in Example 1. The evaluation results are shown in Table 2.

Comparative Example 1

Rolling elements were produced in the same manner as described in Example 1 except that the grinding and superfinishing were conducted such that root-mean-square roughness values Rq were indicated as shown in Table 2. Oil retention depth ratio K and oil retention volume Vo and root-mean-square roughness Rq of the traction surfaces of thus-produced rolling elements were calculated in the same manner as described in Example 1. The calculation results are shown in Table 2. A toroidal-type CVT as shown in FIG. 1 was assembled using the rolling elements and operated to evaluate the traction coefficient under the same condition as described in Example 1. The evaluation results are shown in Table 2.

Comparative Example 2

Rolling elements were produced in the same manner as described in Examples 3 and 4, except that the groove formed in the traction surface of each rolling element was deeper than those of Examples 3 and 4. Oil retention depth ratio K and oil retention volume Vo and root-mean-square roughness Rq of the traction surfaces of thus-produced rolling elements were calculated in the same manner as described in Example 1. The calculation results are shown in Table 2. A toroidal-type CVT as shown in FIG. 1 was assembled using the rolling elements and operated to evaluate the traction coefficient under the same condition as described in Example 1. The evaluation results are shown in Table 2.

TABLE 2

| Example | Input disk and output disk | | | Power rollers | | |
|---|---|---|---|---|---|---|
| | K | Rq $\mu$m | Vo mm$^3$/mm$^2$ | K | Rq $\mu$m | Vo mm$^3$/mm$^2$ |
| Ex. 1 | 1.8 | 0.045 | 9.00E-06 | 1.1 | 0.1 | 1.80E-05 |
| Ex. 2 | 1.5 | 0.05 | 1.00E-05 | 1.2 | 0.15 | 2.00E-05 |
| Ex. 3 | 1.8 | 0.02 | 1.80E-06 | 1.5 | 0.2 | 3.60E-05 |
| Ex. 4 | 1.2 | 0.025 | 3.00E-06 | 23.58 | 0.639 | 4.00E-04 |
| Com. Ex. 1 | 0.54 | 0.022 | 1.80E-06 | 0.54 | 0.022 | 1.80E-06 |
| Com. Ex. 2 | 0.6 | 0.03 | 1.20E-06 | 0.01 | 1.1 | 2.10E-06 |

| Example | Rqsyn $\mu$m | h/Rqsyn | Vosyn mm$^3$/mm$^2$ | h/Vosyn | Traction coefficient |
|---|---|---|---|---|---|
| Ex. 1 | 0.1097 | 1.82384 | 2.01E-05 | 9.93808 | 0.072 |
| Ex. 2 | 0.1581 | 1.26491 | 2.24E-05 | 8.94427 | 0.074 |
| Ex. 3 | 0.201 | 0.99504 | 3.6E-05 | 5.54862 | 0.075 |
| Ex. 4 | 0.6395 | 0.31275 | 3.5E-04 | 0.57141 | 0.08 |
| Com. Ex. 1 | 0.0311 | 6.42824 | 2.55E-06 | 78.5674 | 0.065 |
| Com. Ex. 2 | 1.1004 | 0.18175 | 2.42E-06 | 82.6898 | — |

As be apparent from the results shown in Table 2, excellent traction performance was exhibited in Example 1 as compared with Comparative Examples 1 and 2. In Example 1, ratio h/Rqsyn of traction oil film thickness h ($\mu$m) to root-sum-square value Rqsyn of root-mean-square roughness values Rq of the traction surfaces was not more than 3.0 when oil retention depth ratio K was not less than 0.9 and oil retention volume Vo was not less than $7\times10^{-6}$ mm$^3$/mm$^2$ under the operating condition that the temperature of the traction portion of each traction surface was highest. Further, in Example 1, ratio h/Vosyn of traction oil film thickness h (mm) to root-sum-square value of oil retention volumes Vo (mm$^3$/mm$^2$,) of the traction surfaces was not more than 15.0 when oil retention depth ratio K was not less than 0.9 under the operating condition that the temperature of the traction portion of each traction surface was highest. In Examples 2 and 3, more excellent traction coefficients were exhibited. In contrast, in Comparative Examples 1 and 2, satisfactory traction coefficient was not exhibited. In Comparative Example 2, root-sum-square value Rqsyn was not less than 1.0 $\mu$m and ratio h/Rqsyn was not more than 0.2. This caused vibration of the rolling elements to increase during the evaluation test, so that the evaluation test was interrupted. The traction surfaces had peelings as well as fine cracks when observed. It has been found that the rolling elements were poor in durability in Comparative Example 2.

This application is based on Japanese Patent Application No. 2000-081587 filed on Mar. 23, 2000, the entire contents of which, inclusive of the specification, claims and drawings, are hereby incorporated by reference herein.

Although the invention has been described above by reference to certain embodiment and examples of the invention, the invention is not limited to the embodiment and examples described above. Modifications and variations of the embodiment and examples described above will occur to those skilled in the art, in light of the above teachings. The scope of the invention is defined with reference to the following claims.

What is claimed is:

1. A toroidal continuously variable transmission for automobiles, comprising:

a plurality of rolling elements having traction surfaces cooperating with each other to transmit a power between the rolling elements via a traction oil film formed between the traction surfaces, wherein a ratio h/Rqsyn is not more than 3.0 when an oil retention depth ratio K of oil retention depth Rvk of roughness profile of at least one of the traction surfaces to core roughness depth Rk of the roughness profile thereof is not less than 0.9, and an oil retention volume Vo of the at least one of the traction surfaces is not less than $7\times10^{-6}$ mm$^3$/mm$^2$, where h is a thickness of the traction oil film formed under the operating condition, Rq is root-mean-square roughness values of the traction surfaces, and Rqsyn is a root-sum-square value of the root-mean-square roughness values Rq.

2. The toroidal continuously variable transmission as claimed in claim 1, wherein the ratio h/Rqsyn is not more than 1.0.

3. The toroidal continuously variable transmission as claimed in claim 1, wherein the ratio h/Rqsyn is in a range of 0.2–1.0.

4. The toroidal continuously variable transmission as claimed in claim 1, wherein the thickness h of the traction oil film is calculated using the equation of Hamrock and Dowson:

$$H=3.42\ gv^{0.49}gE^{0.17}(1-e^{-0.68\ k})$$

where $H=(h/Rx)(W/U)$ $gv=GW^3/U^2$ $gE=W^{8/3}/U^2$ $k=(Ry/Rx)^{2/\pi}$ $U=\eta ou/(E'Rx)$ $W=w/(E'Rx^2)$ $G=\alpha E'$ where H is a parameter of a film thickness, gv is a parameter of viscosity, gE is a parameter of elasticity, and k is a parameter of ellipse, Rx is an equivalent radius of curvature in a rolling direction of the traction portion of the traction surface, W is a parameter of load, U is a parameter of speed, G is a parameter of material, Ry is an equivalent radius of curvature in a direction perpendicular to the rolling direction of the traction portion of the traction surface, $\eta_o$ is an oil viscosity under atmospheric pressure, u is a rolling speed of the traction portion of the traction surface, E' is an equivalent vertical elastic coefficient of the traction portion of the traction surface, w is a pressing force applied to the traction portion of the traction surface, and $\alpha$ is a pressure viscosity coefficient.

5. The toroidal continuously variable transmission as claimed in claim 1, wherein the operating condition is the condition that an engine output is maximum and a temperature of a traction oil to be supplied to the traction surfaces is highest.

6. A toroidal continuously variable transmission for automobiles, comprising:

a plurality of rolling elements having traction surfaces cooperating with each other to transmit a power between the rolling elements via a traction oil film formed between the traction surfaces, wherein an oil retention depth ratio K of oil retention depth Rvk of roughness profile of at least one of the traction surfaces to core roughness depth Rk of the roughness profile thereof is not less than 0.9 and a ratio h/Vosyn is not more than 15.0, where h is a thickness of the traction oil film formed under the operating condition, Vo is oil retention volumes of the traction surfaces, and Vosyn is a root-sum-square value of oil retention volumes Vo.

7. The toroidal continuously variable transmission as claimed in claim 6, wherein the ratio h/Vosyn is not more than 5.0.

8. The toroidal continuously variable transmission as claimed in claim 6, wherein the thickness h of the traction oil film is calculated using the equation of Hamrock and Dowson:

$$H=3.42\ gv^{0.49}gE^{0.17}(1-e^{-0.68\ k})$$

where $H=(h/Rx)(W/U)$ $gv=GW^3/U^2$ $gE=W^{8/3}/U^2$ $k=(Ry/Rx)^{2/\pi}$ $U=\eta ou/(E'Rx)$ $W=w/(E'Rx^2)$ $G=\alpha E'$ where H is a parameter of a film thickness, gv is a parameter of viscosity, gE is a parameter of elasticity, and k is a parameter of ellipse, Rx is an equivalent radius of curvature in a rolling direction of the traction portion of the traction surface, W is a parameter of load, U is a parameter of speed, G is a parameter of material, Ry is an equivalent radius of curvature in a direction perpendicular to the rolling direction of the traction portion of the traction surface, $\eta_o$ is an oil viscosity under atmospheric pressure, u is a rolling speed of the traction portion of the traction surface, E' is an equivalent vertical elastic coefficient of the traction portion of the traction surface, w is a pressing force applied to the traction portion of the traction surface, and $\alpha$ is a pressure viscosity coefficient.

9. The toroidal continuously variable transmission as claimed in claim 6, wherein the operating condition is the condition that an engine output is maximum and a temperature of a traction oil to be supplied to the traction surfaces is highest.

10. A toroidal continuously variable transmission for automobiles, comprising:

a plurality of rolling elements having traction surfaces cooperating with each other to transmit a power between the rolling elements via a traction oil film formed between the traction surfaces, wherein an oil retention depth ratio K of oil retention depth Rvk of roughness profile of at least one of the traction surfaces to core roughness depth Rk of the roughness profile thereof is not less than 0.9, an oil retention volume Vo of the at least one of the traction surfaces is not less than $7\times10^{-6}$ mm$^3$/mm$^2$, and a root-sum-square value Rqsyn of root-mean-square roughness values Rq of the traction surfaces is not less than 0.07 $\mu$m.

11. The toroidal continuously variable transmission as claimed in claim 10, wherein the root-sum-square value Rqsyn is not less than 0.2 $\mu$m.

12. The toroidal continuously variable transmission as claimed in claim 10, wherein the root-sum-square value Rqsyn is in a range of 0.2–1.0 $\mu$m.

13. A toroidal continuously variable transmission for automobiles, comprising:

a plurality of rolling elements having traction surfaces cooperating with each other to transmit power between the rolling elements via a traction oil film formed between the traction surfaces, wherein an oil retention depth ratio K of oil retention depth Rvk of roughness profile of at least one of the traction surfaces to core roughness depth Rk of the roughness profile thereof is not less than 0.9, and a root-sum-square value Vosyn of oil retention volumes Vo of the traction surfaces is not less than $1.3\times10^{-5}$ mm$^3$/mm$^2$.

14. The toroidal continuously variable transmission as claimed in claim 13, wherein the root-sum-square value Vosyn is not less than $4\times10^{-5}$ mm$^3$/mm$^2$.

* * * * *